UNITED STATES PATENT OFFICE.

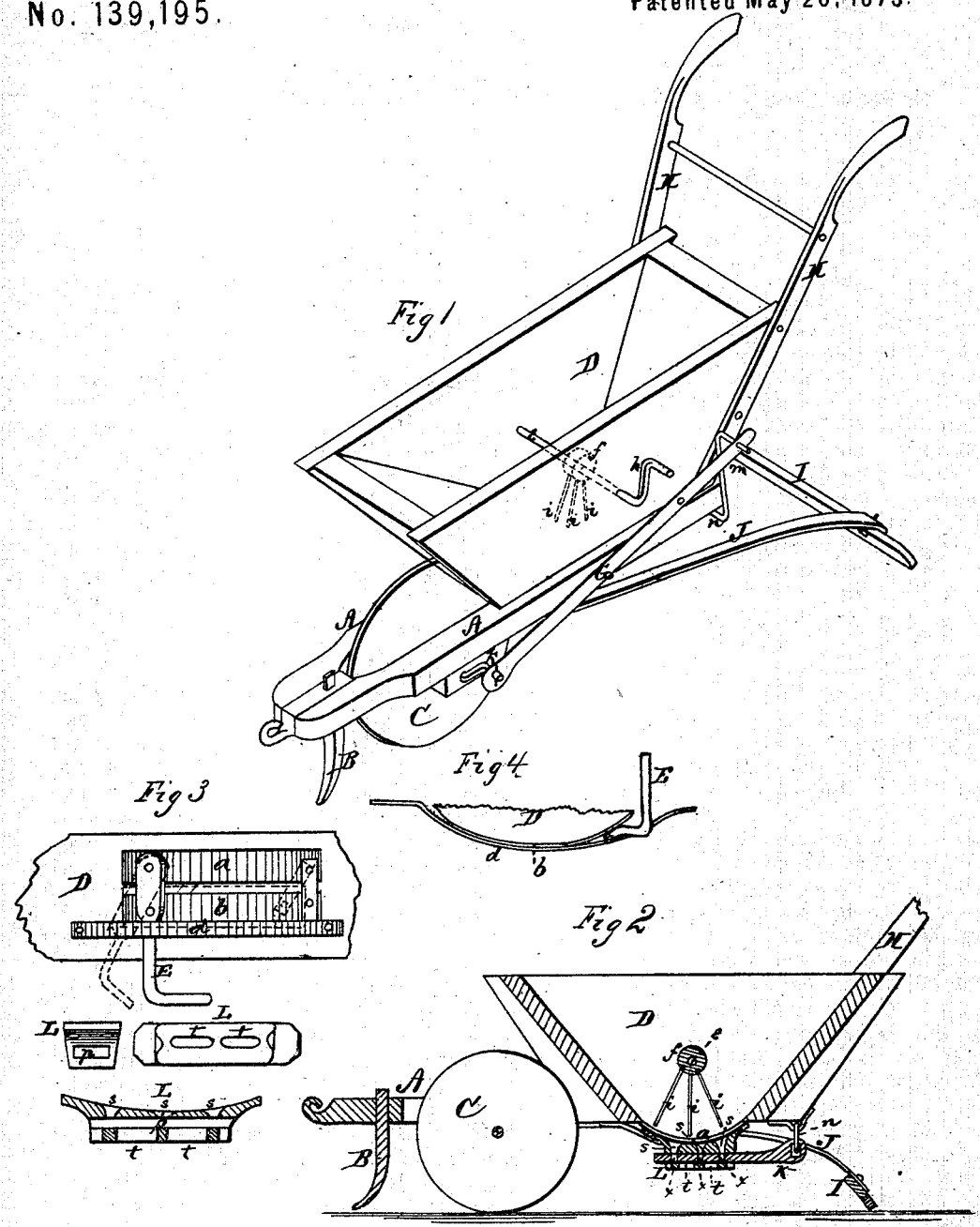

JOHN W. SAVAGE AND FRANCIS M. DOTY, OF PARMITCHIE, MISSISSIPPI.

IMPROVEMENT IN CORN AND COTTON PLANTERS.

Specification forming part of Letters Patent No. 139,195, dated May 20, 1873; application filed February 5, 1873.

*To all whom it may concern:*

Be it known that we, JOHN W. SAVAGE and F. M. DOTY, of Parmitchie, in the county of Alcorn and in the State of Mississippi, have invented certain new and useful Improvements in Seed-Planter; and do hereby declare that the following is a full, clear, and exact description thereof, reference being had to the accompanying drawing and to the letters of reference marked thereon making a part of this specification.

The nature of our invention consists in the construction and arrangement of a seed-planter, as will be hereinafter more fully set forth.

In order to enable others skilled in the art to which our invention appertains to make and use the same, we will now proceed to describe its construction and operation, referring to the annexed drawing, in which—

Figure 1 is a perspective view, and Fig. 2 is a longitudinal vertical section, of our machine. Figs. 3 and 4 are detached views of certain parts thereof.

A A represent two parallel bars, the front ends of which are connected or attached together as shown, with a plow or shovel, B, projecting downward from the same. Between the bars A A, in rear of the plow B, is mounted the wheel C, and in rear of this wheel, upon the bars, is secured the hopper D. The ends of this hopper are inclined, as shown, so that the seed within the hopper will all incline to the center at the bottom. The bottom of the hopper D is curved, as shown, with a longitudinal opening in the same for the passage of the seed. The bottom is formed of two plates, $a$ and $b$, the former of which is stationary. The plate $b$ is held by a guard, $d$, and moved by a lever, E, so as to make the opening between the plates larger or smaller, as may be desired, and thereby regulate the amount of seed to be passed through the same. Through the sides of the hopper D passes a shaft, $e$, upon which, within the hopper, is a roller, $f$, with arms $i\ i$, forming the agitator. One end of the shaft $e$ forms a crank, $h$, which is, by a pitman, G, connected with a crank, $k$, on the shaft or axle of the wheel C. By this means the agitator, when the machine is in motion, receives a rocking motion for stirring the seed while planting cotton-seed. H H are the handles attached to the hopper D, as shown. I represents a covering-bar, connected by means of two spring-bars, J J, to the under sides of the bars A A.

In order to use this seed-planter for planting corn, the rod or pitman G is taken off the crank $h$ and attached to a crank, $m$, on a shaft, $n$, which is placed in suitable boxes under the rear end of the machine. This shaft has a crank at or about its center, upon which is placed the slide K for planting corn. This slide K is made of wood, and has a horizontally-reciprocating motion through a slot in a shoe, L, which is fastened to and immediately under the cotton-seed regulator by means of four wood-screws. The shoe L has three holes, $s\ s$, in its upper side above the slot $p$, through which the slide K passes, and two holes, $t\ t$, in the bottom of the shoe below said slot. In the seed-slide K are three holes, $x\ x$. The three holes $s\ s$ in the top of the shoe receive the corn from the hopper upon the seed-slide, and said slide, by its horizontal motion, draws the corn so that it is immediately received over the holes $t\ t$ in the bottom of the shoe, from which it falls to the ground.

For regulating the amount required in drill the crank $m$ is placed in different holes on the pitman G.

When it becomes necessary to move from one point to another and to prevent wasting corn, the pitman G is detached from the crank $m$, and, as none of the holes are opposite each other, it will not plant unless the seed-slide is in motion.

The shoe L and crank-shaft $n$ are readily removed when cotton-seed is to be planted.

Having thus fully described our invention, what we claim as new, and desire to secure by Letters Patent, is—

The combination of the hopper D with stirrer $f\ i$, movable plate $b$, stationary plate $a$, guard $d$, and lever E, all constructed and operating substantially as set forth.

In testimony that we claim the foregoing we have hereunto set our hands this 20th day of January, 1873.

JOHN W. SAVAGE.
     FRANCIS M. DOTY.

Witnesses:
 JIM A. MCANULTY,
 J. K. HERMAN.